United States Patent
Hayakawa et al.

(10) Patent No.: US 12,233,947 B2
(45) Date of Patent: Feb. 25, 2025

(54) VEHICLE BODY REAR PORTION STRUCTURE

(71) Applicant: HONDA MOTOR CO., LTD., Tokyo (JP)

(72) Inventors: Hirotaka Hayakawa, Tokyo (JP); Kazuya Kimura, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 302 days.

(21) Appl. No.: 17/945,127

(22) Filed: Sep. 15, 2022

(65) Prior Publication Data

US 2023/0110288 A1 Apr. 13, 2023

(30) Foreign Application Priority Data

Sep. 24, 2021 (JP) .................... 2021-155765

(51) Int. Cl.
*B62D 25/20* (2006.01)
*B60K 1/04* (2019.01)

(52) U.S. Cl.
CPC ......... *B62D 25/2027* (2013.01); *B62D 25/20* (2013.01); *B62D 25/2072* (2013.01); *B60K 2001/0438* (2013.01)

(58) Field of Classification Search
CPC ........... B62D 25/2027; B62D 25/2072; B60K 2001/0433; B60K 2001/0438; B60Y 2306/01

See application file for complete search history.

(56) References Cited

U.S. PATENT DOCUMENTS

| | | | |
|---|---|---|---|
| 2008/0238152 A1* | 10/2008 | Konishi | B60N 2/012 296/204 |
| 2017/0113542 A1* | 4/2017 | Muramatsu | B62D 25/2027 |
| 2017/0197666 A1* | 7/2017 | Kabayama | B62D 27/02 |
| 2020/0079437 A1* | 3/2020 | Kim | B62D 25/20 |
| 2020/0231221 A1* | 7/2020 | Tsukamoto | B62D 21/15 |
| 2020/0377154 A1* | 12/2020 | Kim | H01M 50/244 |
| 2021/0023930 A1* | 1/2021 | Jeon | B62D 25/2027 |
| 2021/0284241 A1* | 9/2021 | Wirsing | B62D 25/2027 |
| 2022/0105845 A1* | 4/2022 | Okamura | B60N 2/68 |
| 2022/0161855 A1* | 5/2022 | Tatsuwaki | B62D 21/157 |
| 2022/0227214 A1* | 7/2022 | Yaita | B60K 1/04 |
| 2022/0305898 A1* | 9/2022 | Koshino | B62D 21/155 |
| 2022/0314775 A1* | 10/2022 | Mukumoto | B60K 1/04 |

(Continued)

FOREIGN PATENT DOCUMENTS

JP 6743584 8/2020

*Primary Examiner* — Gregory A Blankenship
(74) *Attorney, Agent, or Firm* — Amin, Turocy & Watson, LLP

(57) ABSTRACT

A vehicle body rear portion includes a floor tunnel, a unit protection cover, and a rear floor panel. The floor tunnel is arranged at a middle in a vehicle width direction of a front floor panel. The unit protection cover covers an upper portion of a protection target unit which is arranged at a rearward position of the floor tunnel. The rear floor panel is arranged at a rearward position of the protection target unit. The unit protection cover and the rear floor panel include a reinforcement structure portion that extends in a vehicle body rearward direction from a tunnel ridge line at right and left upper portions of the floor tunnel.

9 Claims, 3 Drawing Sheets

(56) References Cited

U.S. PATENT DOCUMENTS

| | | | | |
|---|---|---|---|---|
| 2023/0094923 A1* | 3/2023 | Hayakawa | ............... | B60K 1/04 |
| | | | | 296/187.08 |
| 2023/0101105 A1* | 3/2023 | Hayakawa | ............... | B60L 50/66 |
| | | | | 180/68.5 |
| 2023/0101421 A1* | 3/2023 | Inami | ................. | B62D 25/2027 |
| | | | | 296/193.07 |
| 2023/0101857 A1* | 3/2023 | Hayakawa | ............... | B60K 1/04 |
| | | | | 180/68.5 |
| 2023/0110288 A1* | 4/2023 | Hayakawa | ......... | B62D 25/2027 |
| | | | | 296/204 |
| 2023/0311793 A1* | 10/2023 | Hayakawa | ............... | B60R 16/04 |
| | | | | 296/187.12 |
| 2023/0373289 A1* | 11/2023 | Grosse | ............... | B62D 25/2027 |
| 2023/0398859 A1* | 12/2023 | An | ......................... | B60K 15/07 |
| 2023/0406416 A1* | 12/2023 | An | ....................... | B62D 25/088 |
| 2024/0034141 A1* | 2/2024 | Yoshida | ............... | B62D 25/087 |
| 2024/0124071 A1* | 4/2024 | Miura | .................... | B62D 25/20 |
| 2024/0190516 A1* | 6/2024 | Kim | ..................... | B62D 25/087 |

* cited by examiner

VEHICLE BODY REAR PORTION STRUCTURE

CROSS-REFERENCE TO RELATED APPLICATION

Priority is claimed on Japanese Patent Application No. 2021-155765, filed on Sep. 24, 2021, the contents of which are incorporated herein by reference.

BACKGROUND

Field of the Invention

The present invention relates to a vehicle body rear portion structure in which a protection target unit such as a battery unit is arranged at a rearward position of a floor tunnel.

Background

As a structure of a floor portion of a vehicle, such a structure is known in which a floor tunnel is arranged at a middle in a vehicle width direction of a front floor panel, and a rear portion of the floor tunnel extends to a front end portion of a rear floor panel (for example, refer to Japanese Patent No. 6743584).

In a vehicle body rear portion structure described in Japanese Patent No. 6743584, the floor tunnel is provided in the middle in the vehicle width direction of the front floor panel, and a rear portion of the floor tunnel is connected to a front wall of the rear floor panel. Therefore, the front floor panel and the rear floor panel are connected to each other with high stiffness at the middle portion in the vehicle width direction.

Further, in the vehicle described in Japanese Patent No. 6743584, a battery unit which is a protection target unit (a unit for which it is particularly important to prevent deformation or damage at the time of input of an impact load from the outside) is arranged at a substantially middle portion in a vehicle body forward-rearward direction of the front floor panel. The battery unit is protected and surrounded by a plurality of reinforcement frames at the substantially middle portion in the vehicle body forward-rearward direction of the front floor panel.

SUMMARY

In the vehicle body rear portion structure described in Japanese Patent No. 6743584, the protection target unit is arranged at a substantially middle position in the vehicle body forward-rearward direction of the front floor panel. Therefore, by the plurality of reinforcement frames, it is possible to sufficiently protect the protection target unit in a substantially middle region in the vehicle body forward-rearward direction where space is available.

On the other hand, depending on the vehicle, it may be desirable to arrange a protection target unit such as a battery unit at a rearward position of a floor tunnel at a rear portion of the front floor panel. In this case, the protection target unit divides the floor tunnel and the rear floor panel, and smooth transmission of an impact load between the floor tunnel and the rear floor panel is prevented. Further, in this case, since the protection target unit divides the floor tunnel and the rear floor panel, the rigidity against a torsional load (a torsional load around a center axis line along the vehicle body forward-rearward direction) that acts between the front floor panel and the rear floor panel is also decreased.

Thereby, there is a concern of deformation or damage of a peripheral portion of the protection target unit, and it is desired to further reliably protect the protection target unit.

An aspect of the present invention provides a vehicle body rear portion structure capable of further reliably protecting a protection target unit arranged at a rearward position of a floor tunnel.

A vehicle body rear portion structure according to an aspect of the present invention includes: a floor tunnel that is arranged at a middle in a vehicle width direction of a front floor panel: a unit protection cover that covers an upper portion of a protection target unit which is arranged at a rearward position of the floor tunnel; and a rear floor panel that is arranged at a rearward position of the protection target unit, wherein the unit protection cover and the rear floor panel include a reinforcement structure portion that extends in a vehicle body rearward direction from a tunnel ridge line at right and left upper portions of the floor tunnel.

According to the configuration described above, the rear portion of the floor tunnel and the rear floor panel are connected to each other with high stiffness through the reinforcement structure portion. Therefore, it becomes possible to smoothly perform transmission of a torsional load and load transmission in the vehicle body forward-rearward direction between the floor tunnel and the rear floor panel through the reinforcement structure portion.

A protrusion portion that rises upward and has right and left extension ridge lines each extending continuously in a vehicle body rearward direction from each of the right and left tunnel ridge lines may be provided on a middle in the vehicle width direction of the unit protection cover and the rear floor panel, and the reinforcement structure portion may be constituted of the right and left extension ridge lines of the protrusion portion.

In this case, the right and left tunnel ridge lines of the floor tunnel continue to the right and left extension ridge lines of the protrusion portion of the rear floor panel and the unit protection cover. Therefore, even with a simple configuration, it is possible to smoothly perform load transmission in the vehicle body forward-rearward direction between the floor tunnel and the rear floor panel through the protrusion portion.

At least a middle region in the vehicle width direction of the unit protection cover may be formed to rise further upward than an upper surface of the floor tunnel, and the protrusion portion may include a front wall protrusion region that is formed on a front wall of the unit protection cover and an upper wall protrusion region that is formed on an upper wall of the unit protection cover.

In this case, since the unit protection cover is formed to rise further upward than the upper surface of the floor tunnel, it is possible to cover the upper portion of the protection target unit with a sufficient height by the unit protection cover. Further, in the protrusion portion of the unit protection cover, it is possible to perform smooth load transmission between the floor tunnel and the rear floor panel through the front wall protrusion region and the upper wall protrusion region.

The protrusion portion of the unit protection cover may include a side wall that extends downward from each of the right and left extension ridge lines of the protrusion portion, and the side wall may be inclined outward in the vehicle width direction and downward from the extension ridge line of the protrusion portion.

In this case, the side wall on the right and left sides of the protrusion portion can efficiently perform load transmission in the vehicle body forward-rearward direction in cooperation with the extension ridge line of the protrusion portion. Further, in the present configuration, since the side wall on the right and left sides of the protrusion portion is inclined outward in the vehicle width direction and downward, when an impact load is input to the unit protection cover from one side of the vehicle, the impact load can be smoothly transmitted to an upper wall of the protrusion portion through the inclination of the side wall on one side and be smoothly transmitted from the upper wall of the protrusion portion to another side of the vehicle through the inclination of the side wall on the other side. Accordingly, when the present configuration is employed, at the time of input of an impact load from a sideward direction of the vehicle, it is possible to smoothly transmit the input load to the other side in the vehicle width direction while protecting the protection target unit.

A rear cross member that extends along the vehicle width direction and is connected to a skeleton frame on vehicle body right and left sides may be provided on the rear floor panel, and the reinforcement structure portion may extend to a position that intersects the rear cross member.

In this case, an impact load in the vehicle body forward-rearward direction that is input to the reinforcement structure portion can be received by the rear cross member that is connected to the skeleton frame on the vehicle body right and left sides. Accordingly, when the present configuration is employed, since the rear portion of the floor tunnel is connected to the skeleton frame on the vehicle body right and left sides through the reinforcement structure portion and the rear cross member with high stiffness, it is possible further prevent deformation or damage of the peripheral portion of the protection target unit.

An outer end portion in the vehicle width direction at a rear of the front floor panel may be connected to a skeleton frame on vehicle body right and left sides that extends along a vehicle body forward-rearward direction, a rear edge portion of the front floor panel may include a standing wall that stands upward and a step wall that is bent and extends rearward from an upper end portion of the standing wall, a rear end portion of the floor tunnel may be joined to the standing wall of the front floor panel, and the step wall may be arranged at a position adjacent to an outside in the vehicle width direction of the front wall protrusion region of the unit protection cover.

In this case, the step wall of the rear edge portion of the front floor panel is arranged adjacent to the outside in the vehicle width direction of the front wall protrusion region of the unit protection cover. Therefore, when an impact load is input to the unit protection cover from one side of the vehicle, an input weight can be smoothly transmitted to another side of the vehicle through the step wall of the rear edge portion of the front floor panel and the front wall protrusion region of the unit protection cover. Accordingly, when the present configuration is employed, it is possible to further prevent deformation or damage of the protection target unit at the time of input of an impact load from a vehicle sideward direction.

A patch member that extends from an outer end portion in the vehicle width direction to a vicinity of the front wall protrusion region may be joined to a surface on an opposite side of a vehicle room side of the step wall and the standing wall of the front floor panel.

In this case, when an impact load is input to a front region of the unit protection cover from one side of the vehicle, an input weight can be efficiently transmitted to the front wall protrusion region through the standing wall and the step wall at a rear edge portion of the front floor panel that is reinforced by the patch member. Accordingly, when the present configuration is employed, the impact load input to the front region of the unit protection cover from one side of the vehicle can be efficiently transmitted to another side of the vehicle, and it is possible to further prevent deformation or damage of the protection target unit.

A pair of joint flanges that are joined to the standing wall of the front floor panel located at right and left positions of the floor tunnel may be provided on a rear end portion of the floor tunnel, and each of the joint flanges may be welded to the standing wall and the patch member in a triplicated manner.

In this case, since the joint flange on the rear end portion of the floor tunnel is welded to the patch member and the standing wall at the rear portion of the front floor panel in a triplicated manner, an impact load that is input from a vehicle sideward direction through the patch member and the standing wall can be transmitted to the rear end portion of the floor tunnel with high stiffness. Accordingly, when the present configuration is employed, an impact load input to one side of the vehicle can be further efficiently transmitted to another side of the vehicle, and it is possible to further reliably prevent deformation or damage of the protection target unit.

An intersection ridge line that extends along the vehicle width direction between the pair of joint flanges may be provided on a rear end portion of the floor tunnel.

In this case, the stiffness in the vehicle width direction of the rear end portion of the floor tunnel is enhanced by the intersection ridge line. Therefore, an impact load that is input from one side of the vehicle to the front region of the unit protection cover is efficiently transmitted from one joint flange through the intersection ridge line to the other joint flange at the rear end portion of the floor tunnel. Accordingly, when the present configuration is employed, it is possible to further reliably prevent deformation or damage of the protection target unit at the time of input of the impact load from a vehicle lateral direction.

Since in the vehicle body rear portion structure according to an aspect of the present invention, the reinforcement structure portion that extends in the vehicle body rearward direction from the tunnel ridge line at right and left sides of the floor tunnel is provided on the unit protection cover and the rear floor panel, it is possible to smoothly perform transmission of the torsional load and load transmission in the vehicle body forward-rearward direction between the floor tunnel and the rear floor panel through the reinforcement structure portion. Therefore, even when a large torsional load or an impact load in the forward-rearward direction is input to the vehicle, it is possible prevent deformation or damage of the peripheral portion of the protection target unit. Accordingly, when the vehicle body rear portion structure according to the present invention is employed, it is possible to further reliably protect the protection target unit arranged at a rearward position of the floor tunnel.

DESCRIPTION OF EMBODIMENTS

Figure 1:
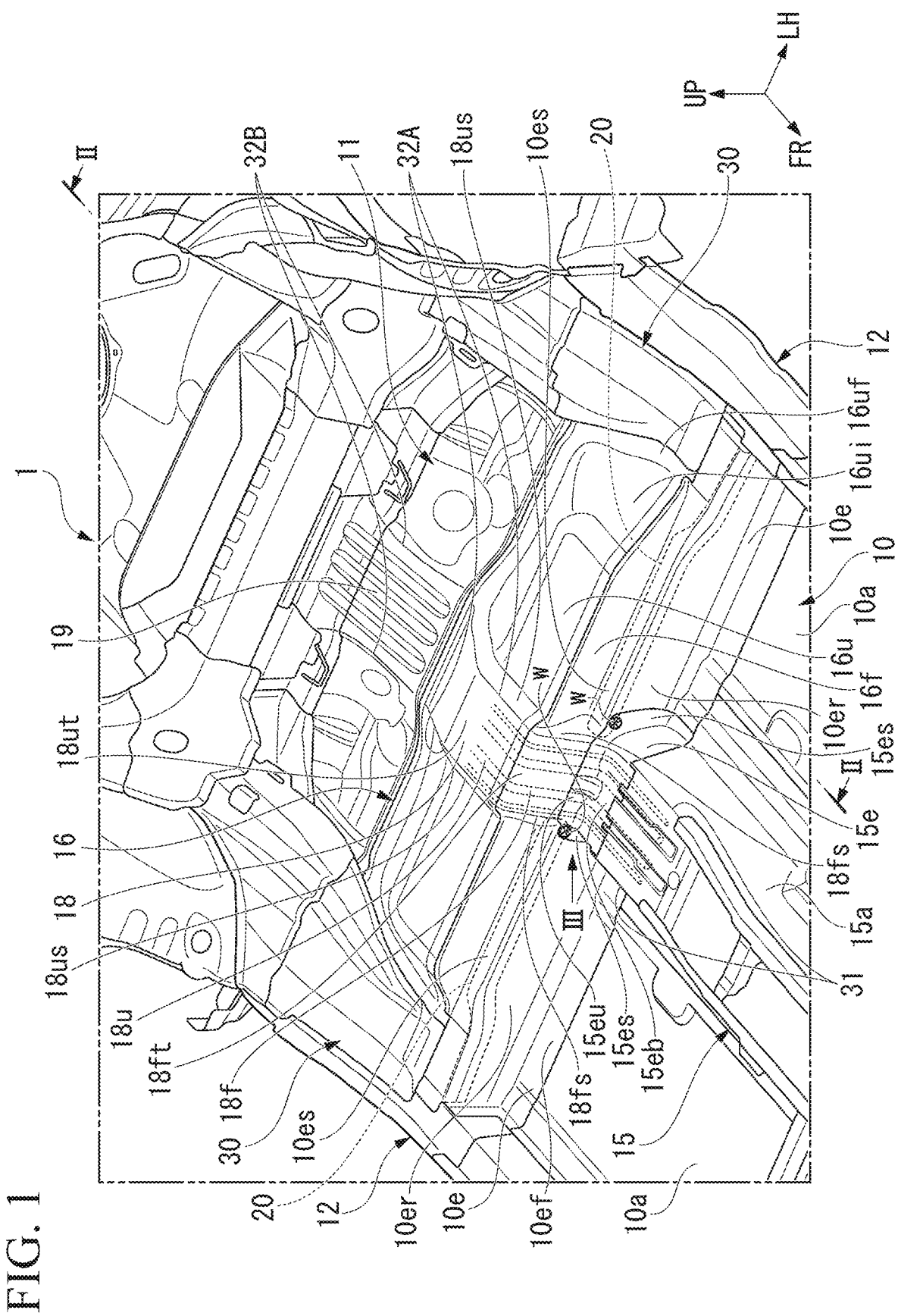
FIG. 1 is a perspective view showing a vehicle body rear portion of a vehicle according to an embodiment.

Hereinafter, an embodiment of the present invention will be described with reference to the drawings. In the following description, directions of forward, rearward, upward, downward, rightward, and leftward mean directions with respect to a direction in which a vehicle proceeds forward unless otherwise specified. In appropriate places in the drawings, an arrow FR that indicates a vehicle forward direction, an arrow UP that indicates a vehicle upward direction, and an arrow LH that indicates a vehicle leftward direction are shown.

Figure 2:
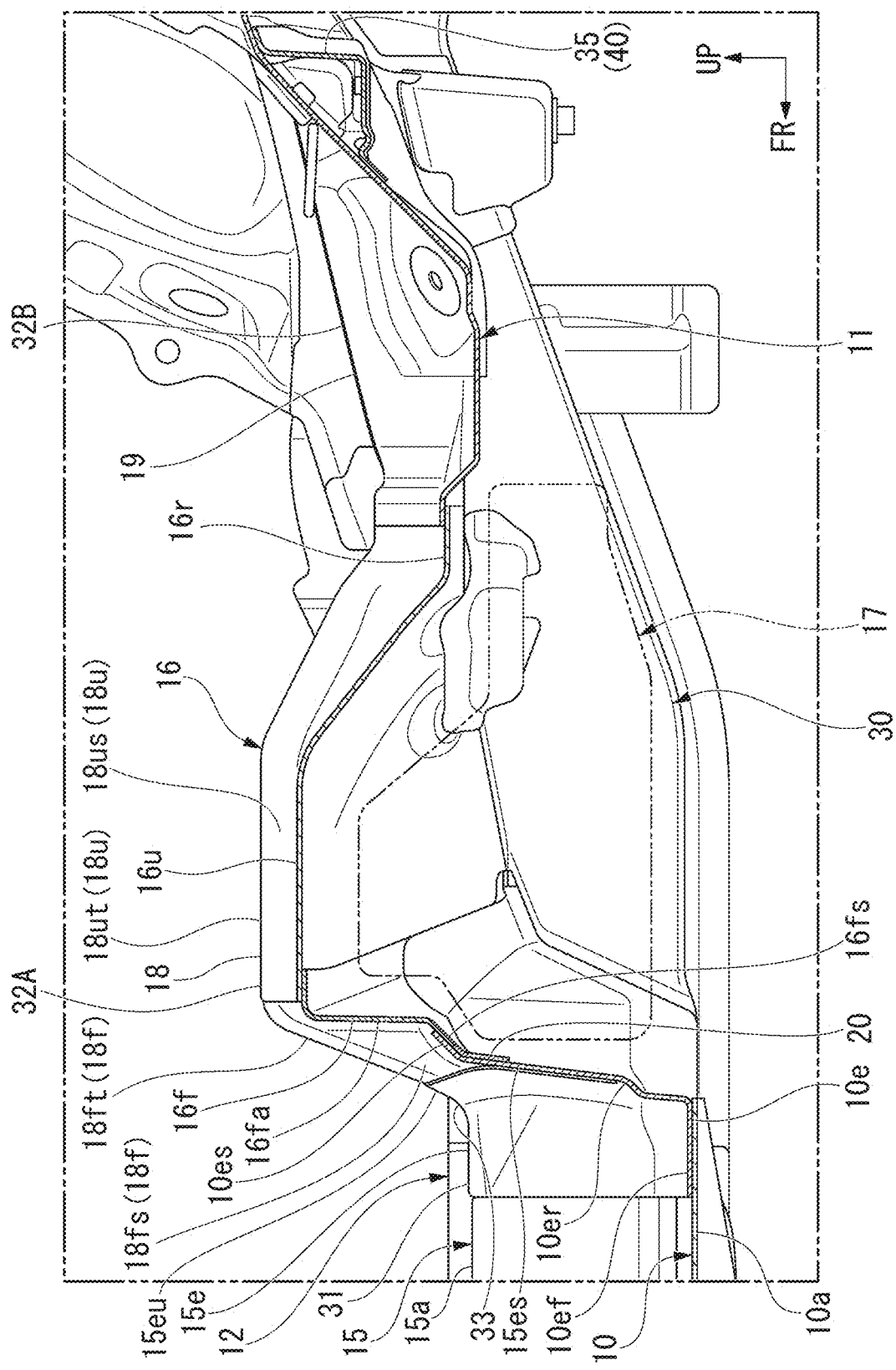
FIG. 2 is a cross-sectional view along a II-II line of FIG. 1 of the vehicle according to the embodiment.

FIG. 1 is a perspective view showing a vehicle body rear portion of a vehicle 1 according to the present embodiment viewed from a forward, leftward, and diagonally upward direction. FIG. 2 is a cross-sectional view along a II-II line of FIG. 1.

Reference numeral 10 in the drawing indicates a front floor panel arranged below an occupant room. Reference numeral 11 indicates a rear floor panel arranged at a rearward position of a front floor panel 10. The rear floor panel 11 constitutes a floor surface at a rearward position (for example, a load room) of the occupant room. A side sill 12 which is a skeleton frame that extends along a vehicle body forward-rearward direction is arranged on both right and left sides on a lower portion side of the occupant room. The front floor panel 10 is provided on right and left side sills 12. A lower surface side of the front floor panel 10 is supported by a plurality of floor frames (not shown). A rear side frame 30 which is a skeleton frame that extends to a vehicle body rearward side is joined to the inside in a vehicle width direction of a rear region of each of the side sills 12 on right and left sides of the vehicle body. The rear floor panel 11 is provided on right and left rear side frames 30.

The front floor panel 10, the rear floor panel 11, the side sill 12, and the rear side frame 30 described above, and main configuration members of the vehicle body rear portion described later are mainly formed of a metal material.

A floor tunnel 15 that extends along the vehicle body forward-rearward direction is provided on a middle in the vehicle width direction of the front floor panel 10. The floor tunnel 15 is formed in a substantially U-shape in a cross-section that opens downward. The substantially U-shape in a cross-section extends along the vehicle body forward-rearward direction. The floor tunnel 15 projects upward relative to a substantially flat base wall (a bottom wall that extends substantially horizontally) of the front floor panel 10. A tunnel ridge line 31 that extends along the vehicle body forward-rearward direction is formed on right and left sides of an upper end portion of the floor tunnel 15. The tunnel ridge line 31 is a ridge line formed of a bend angle portion between an upper wall of the floor tunnel 15 and each of right and left side walls.

An upper surface of the rear floor panel 11 is set to be higher than an upper surface of the front floor panel 10. A unit protection cover 16 made of a metal is arranged between the front floor panel 10 and the rear floor panel 11. A front edge portion of the rear floor panel 11 and a rear edge portion of the front floor panel 10 are welded and fixed to the unit protection cover 16.

A rear cross panel 35 having a substantially L shape in a cross-section that intersects the vehicle width direction is joined to a lower surface of the rear floor panel 11 at a position that is separated rearward by a predetermined distance from a joint portion with the unit protection cover 16 on the front end side. The rear cross panel 35 constitutes a closed cross-section that extends along the vehicle width direction together with the rear floor panel 11. The closed cross-section portion formed of the rear floor panel 11 and the rear cross panel 35 constitutes a rear cross member 40 that extends along the vehicle width direction at a rearward position of the unit protection cover 16. An outer end portion in the vehicle width direction of the rear cross member 40 is connected to a corresponding rear side frame 30 on the right and left sides.

As shown in FIG. 2, a battery unit 17 which is protection target unit is arranged below the unit protection cover 16. Although detailed description in the drawings is omitted, the battery unit 17 includes a battery module constituted by laminating a plurality of batteries and a control unit that controls discharging and charging between the battery module and a motor for driving the vehicle.

In FIG. 2, although description in the drawings is omitted, a base plate which is a unit accommodation portion is provided between a front portion of the rear floor panel 11 and a rear end portion of the front floor panel 10. The battery unit 17 is provided on the base plate, and an upper side of the battery unit 17 is covered by the unit protection cover 16. In the present embodiment, a front edge portion of the rear floor panel 11 and a rear edge portion of the front floor panel 10 are connected via the base plate and the unit protection cover 16.

In the present embodiment, the battery unit 17 is arranged below the unit protection cover 16; however, in the case of a vehicle on which an engine is provided, a fuel tank may be arranged at the same location (a lower position of the unit protection cover 16). In this case, the fuel tank and an accompanying component of the fuel tank are the protection target unit.

As shown in FIG. 2, the unit protection cover 16 includes: a rear flange 16r that is joined to a front end portion of the rear floor panel 11: an upper wall 16u that is inclined upward and forward from the rear flange 16r and then extends forward substantially horizontally; and a front wall 16f that is bent and extends downward from a front end portion of the upper wall 16u.

As shown in FIG. 1, the upper wall 16u of the unit protection cover 16 is higher than an upper surface of the floor tunnel 15. Accordingly, the unit protection cover 16 rises upward relative to the upper surface of the floor tunnel 15.

A side inclination portion 16ui that extends to be inclined downward and outward in the vehicle width direction and a joint flange 16uf that extends substantially horizontally outward in the vehicle width direction from a lower end of the side inclination portion 16ui are formed in an outer region in the vehicle width direction of the upper wall 16u of the unit protection cover 16. The joint flange 16uf is formed so as to continue to a rear flange 11r of the unit protection cover 16. Each of right and left joint flanges 16uf is overlapped with a corresponding rear side frame 30 on right and left sides and is welded and fixed to the rear side frame 30 in that state.

As shown in FIG. 2, the front wall 16f of the unit protection cover 16 includes: a front wall main body wall 16fa that extends downward from a front end portion of the upper wall 16u; and a step wall 16fs that is bent and extends forward from a lower end of the front wall main body wall 16fa.

A protrusion portion 18 having substantially the same width as an upper end portion of the floor tunnel 15 is formed on a middle in the vehicle width direction of the front wall 16f and the upper wall 16u of the unit protection cover 16. The protrusion portion 18 includes: an upper wall protrusion region 18u that is formed on the upper wall 16u of the unit protection cover 16; and a front wall protrusion region 18f that is formed on the front wall 16f of the unit protection cover 16. Both the upper wall protrusion region 18u and the front wall protrusion region 18f have a substantially flat top wall 18ut, 18ft and right and left side walls 18us, 18fs. The right and left side walls 18us of the upper wall protrusion region 18u protrude upward. The right and left side walls 18fs of the front wall protrusion region 18f protrude in a forward upward direction of the vehicle. Bend corner portions between the right and left side walls 18us, 18fs and the top walls 18ut, 18ft of the upper wall protrusion region 18u and the front wall protrusion region 18f continue to the right and left tunnel ridge lines 31 of the floor tunnel 15 in the vehicle body forward-rearward direction. Each of the bend corner portions constitutes an extension ridge line 32A that extends continuously from each of the right and left tunnel ridge lines 31 of the floor tunnel 15 in a vehicle body rearward direction.

The right and left side walls 18us of the upper wall protrusion region 18u extend to be inclined outward in the vehicle width direction in a downward direction from the corresponding right and left extension ridge lines 32A. The right and left side walls 18fs of the front wall protrusion region 18f are inclined outward in the vehicle width direction in a rearward downward direction from the corresponding right and left extension ridge lines 32A.

A protrusion portion 19 that is similar to the protrusion portion 18 of the unit protection cover 16 is formed on a middle in the vehicle width direction of the rear floor panel 11 so as to continue to the protrusion portion 18 of the unit protection cover 16. The protrusion portion 19 of the rear floor panel 11 is formed in substantially the same width as the protrusion portion 18 of the unit protection cover 16, and bend corner portions between a top wall (reference numeral is omitted) and right and left side walls (reference numeral is omitted) constitute extension ridge lines 32B that continue to the right and left extension ridge lines 32A of the unit protection cover 16.

In the vehicle body rear portion structure of the present embodiment, the protrusion portions 18, 19 at the middle in the vehicle width direction of the unit protection cover 16 and the rear floor panel 11 are provided so as to continue to an upper portion of the floor tunnel 15. Then, the right and left extension ridge lines 32A, 32B of the protrusion portions 18, 19 extend so as to continue from the right and left tunnel ridge line 31 of the floor tunnel 15 to a vehicle body rearward side. In the present embodiment, the right and left extension ridge lines 32A, 32B of the unit protection cover 16 and the rear floor panel 11 constitute a reinforcement structure portion that extends in a vehicle body rearward direction from the right and left tunnel ridge lines 31 of the floor tunnel 15.

The front floor panel 10 and the floor tunnel 15 are constituted by welding a separate terminal panel 10e, 15e to a rear end portion of a main body panel 10a, 15a. The front floor panel 10 is constituted to be separated to right and left sides of the floor tunnel 15, and the right and left sides of the front floor panel 10 are connected to each other via the floor tunnel 15. The terminal panel 10e of the front floor panel 10 is also constituted to be separated to right and left sides.

As shown in FIG. 2, the terminal panel 10e of the front floor panel 10 includes: a connection flange 10ef that is joined to an upper surface of a rear end portion of the main body panel 10a of the front floor panel 10; a standing wall 10er that stands upward from a rear end portion of the connection flange 10ef; and a step wall 10es that extends to be bent rearward from an upper end portion of the standing wall 10er. The step wall 10es is joined to an upper surface of the step wall 16fs of the front wall 16f of the unit protection cover 16.

The standing wall 10er and the step wall 10es of the right and left terminal panel 10e extend from a connection position with the side sill 12 on the outer side in the vehicle width direction to a position where at least part of the standing wall 10er and the step wall 10es overlap in the vehicle width direction with the floor tunnel 15. The right and left terminal panels 10e may be constituted as a continuous integral component.

In the terminal panel 10e of the front floor panel 10, a patch member 20 having a substantially L shape in a cross-section orthogonal to the vehicle width direction is joined to a rear surface (a surface on the opposite side of a vehicle room side) of the standing wall 10er and the step wall 10es. The patch member 20 extends from an outer end portion in the vehicle width direction of the terminal panel 10e to the vicinity of the front wall protrusion region 18f of the unit protection cover 16.

Figure 3:
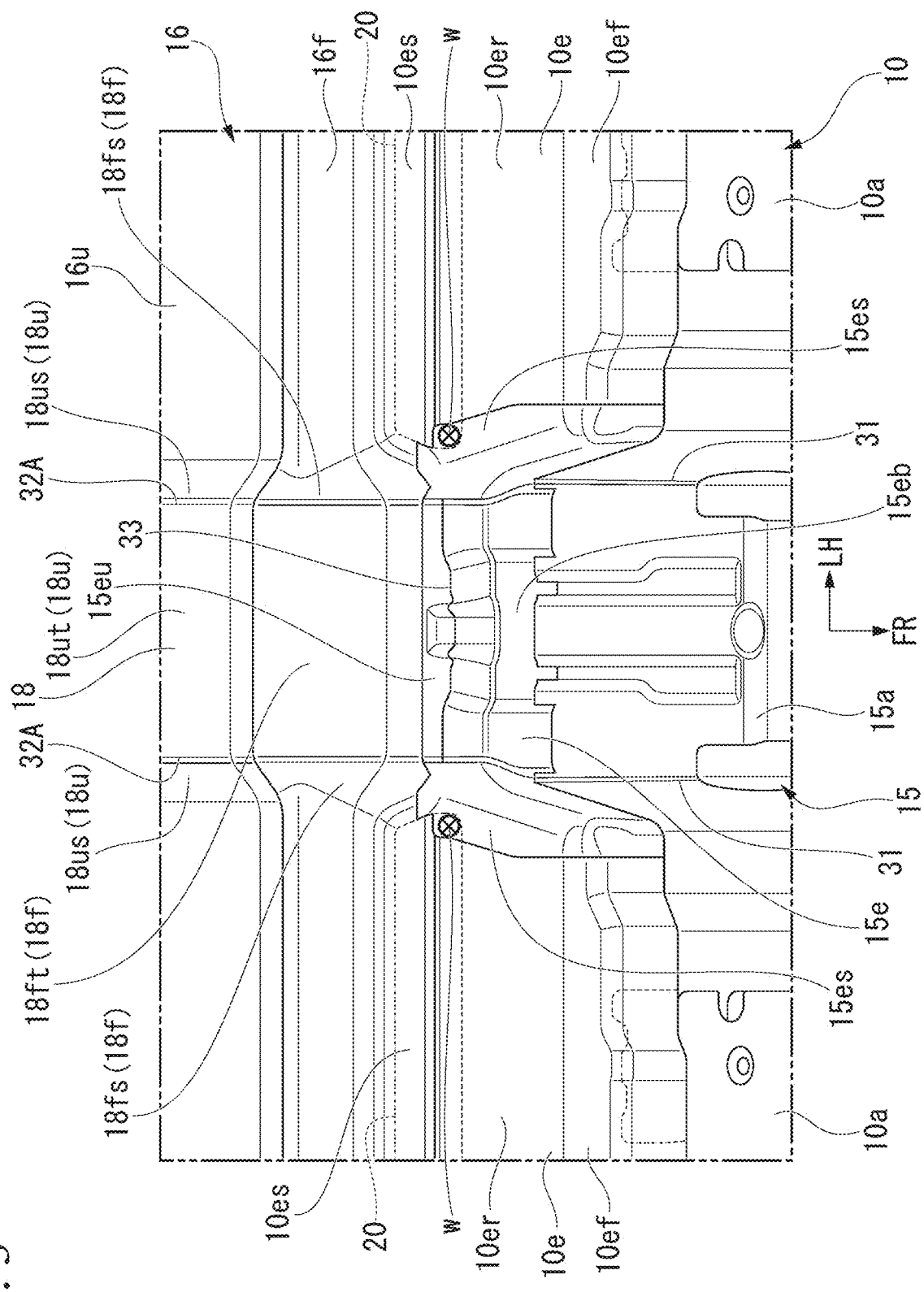
FIG. 3 is a III arrow view of FIG. 1 of the vehicle according to the embodiment.

FIG. 3 is a III arrow view of FIG. 1.

As shown in FIG. 1 and FIG. 3, the terminal panel 15e of the floor tunnel 15 includes: a base portion 15eb having a substantially U-shape that opens downward; a side flange 15es (joint flange) that is bent and extends outward in the vehicle width direction from a rear end portion of the right and left side walls of the base portion 15eb; and an upper flange 15eu that is bent and extends upward from a rear end portion of the upper wall of the base portion 15eb. A bend angle portion between an upper wall of the base portion 15eb and the upper flange 15eu constitutes an intersection ridge line 33 that extends along the vehicle width direction. The intersection ridge line 33 extends along the vehicle width direction between the right and left side flange 15es (joint flange).

The right and left side flange 15es of the terminal panel 15e are overlapped with a front surface of the standing wall 10er at the rear of the front floor panel 10. In this way, the side flange 15es that is overlapped with front surface of the standing wall 10er is welded to the standing wall 10er and the patch member 20 on the rear side of the standing wall 10er in a triplicated manner.

Reference numeral w in the drawing is given to a weld point of the side flange 15es, the standing wall 10er, and the patch member 20 that are overlapped in a triplicated manner.

The upper flange 15eu of the terminal panel 15e is joined to part of the right and left side walls 18fs and a front surface of the top wall 18ft of the front wall protrusion region 18f of the protrusion portion 18 in the middle of the unit protection cover 16.

When the rear portions of the front floor panel 10 and the floor tunnel 15 and the front portion of the unit protection cover 16 are joined together as described above, the step wall 10es at the rear of the right and left front floor panel 10 are arranged adjacent to the outside in the vehicle width direction of the front wall protrusion region 18f of the unit protection cover 16.

In the vehicle body rear portion of the vehicle 1 of the present embodiment, the reinforcement structure portion (the extension ridge lines 32A, 32B) that extends in the vehicle body rearward direction from the tunnel ridge line 31 at the right and left upper portions of the floor tunnel 15 is provided on the unit protection cover 16 and the rear floor panel 11. Therefore, the rear portion of the floor tunnel 15 and the rear floor panel 11 are connected to each other with high stiffness through the reinforcement structure portion (the extension ridge lines 32A, 32B). Therefore, in the vehicle body rear portion of the vehicle 1 of the present embodiment, even when a large torsional load or an impact load in the forward-rearward direction is input to the vehicle 1, it is possible prevent deformation or damage of the peripheral portion of the battery unit 17 (the protection target unit). Accordingly, when the vehicle body rear portion structure of the present embodiment is employed, it is possible to further reliably protect the battery unit 17 (the protection target unit) arranged at a rearward position of the floor tunnel 15.

Further, in the vehicle body rear portion of the vehicle 1 of the present embodiment, the protrusion portions 18, 19 that rise upward are provided at the middle in the vehicle width direction of the unit protection cover 16 and the rear floor panel 11, and the extension ridge lines 32A, 32B each extending continuously in the vehicle body rearward direction from each of the right and left tunnel ridge lines 31 are formed on the protrusion portions 18, 19. The reinforcement structure portion is constituted of the right and left extension ridge lines 32A, 32B of the protrusion portions 18, 19 of the unit protection cover 16 and the rear floor panel 11. Therefore, although the vehicle body rear portion structure of the present embodiment has a simple configuration, it is possible to smoothly perform load transmission in the vehicle body forward-rearward direction between the floor tunnel 15 and the rear floor panel 11 through the protrusion portions 18, 19.

Further, in the vehicle body rear portion of the vehicle 1 of the present embodiment, the unit protection cover 16 is formed to rise further upward than the upper surface of the floor tunnel 15, and the protrusion portion 18 in the middle in the vehicle width direction of the unit protection cover 16 includes the front wall protrusion region 18*f* that is formed on the front wall 16*f* and the upper wall protrusion region 18*u* that is formed on the upper wall 16*u*. In the present configuration, since the unit protection cover 16 is formed to rise further upward than the upper surface of the floor tunnel 15, it is possible to cover the battery unit 17 (the protection target unit) from above with a sufficient height by the unit protection cover 16. Further, in the present configuration, since the protrusion portion 18 of the unit protection cover 16 has the front wall protrusion region 18*f* and the upper wall protrusion region 18*u*, it is possible to perform smooth load transmission between the floor tunnel 15 and the rear floor panel 11 through the front wall protrusion region 18*f* and the upper wall protrusion region 18*u*.

Further, in the vehicle body rear portion of the vehicle 1 of the present embodiment, the protrusion portion 18 of the unit protection cover 16 includes the side walls 18*us*, 18*fs* that extend downward from the extension ridge line 32A on the right and left sides, and the side walls 18*us*, 18*fs* are inclined outward in the vehicle width direction and downward from the extension ridge line 32A of the protrusion portion 18. In the present configuration, the side walls 18*us*, 18*fs* on the right and left sides of the protrusion portion 18 of the unit protection cover 16 can efficiently perform load transmission in the vehicle body forward-rearward direction in cooperation with the extension ridge line 32A of the protrusion portion 18. Further, in the present configuration, since the side walls 18*us*, 18*fs* on the right and left sides of the protrusion portion 18 are inclined outward in the vehicle width direction and downward, when an impact load is input to the unit protection cover 16 from one side of the vehicle, the impact load can be smoothly transmitted to the top walls 18*ut*, 18*ft* of the protrusion portion 18 through the inclination of the side walls 18*us*, 18*fs* located at the one side and be smoothly transmitted from the top walls 18*ut*, 18*ft* of the protrusion portion 18 to the other side of the vehicle through the inclination of the side walls 18*us*, 18*fs* located at the other side.

Accordingly, when the vehicle body rear portion structure of the present embodiment is employed, at the time of input of an impact load from a sideward direction of the vehicle, it is possible to smoothly transmit the input load to the other side in the vehicle width direction while protecting the battery unit 17 (the protection target unit).

Further, in the vehicle body rear portion of the vehicle 1 of the present embodiment, the rear cross member 40 that extends along the vehicle width direction is provided on the rear floor panel 11, and the outer end portion in the vehicle width direction of the rear cross member 40 is connected to the rear side frame 30 on the right and left sides which is a skeleton frame. The extension ridge lines 32A, 32B which are the reinforcement structure portions of the unit protection cover 16 and the rear floor panel 11 extend to a position that intersects the rear cross member 40. Therefore, in the present configuration, an impact load in the vehicle body forward-rearward direction that is input to the extension ridge lines 32A, 32B which are the reinforcement structure portions can be received by the rear cross member 40 that is connected to the rear side frame 30 on the vehicle body right and left sides.

Accordingly, when the vehicle body rear portion structure of the present embodiment is employed, since the rear portion of the floor tunnel 15 is connected to the rear side frame 30 on the vehicle body right and left sides through the extension ridge lines 32A, 32B and the rear cross member 40 with high stiffness, it is possible further prevent deformation or damage of the peripheral portion of the battery unit 17 (the protection target unit).

Further, in the vehicle body rear portion of the vehicle 1 of the present embodiment, the outer end portion in the vehicle width direction of the terminal panel 10*e* of the front floor panel 10 is connected to the side sill 12 which is a skeleton frame on vehicle room right and left sides, and the standing wall 10*er* that stands upward and the step wall 10*es* that is bent and extends rearward from the upper end portion of the standing wall 10*er* are formed on the rear edge portion of the terminal panel 10*e*. The rear end portion of the floor tunnel 15 is joined to the standing wall 10*er* of the terminal panel 10*e*, and the step wall 10*es* of the terminal panel 10*e* is arranged at a position adjacent to the outside in the vehicle width direction of the front wall protrusion region 18*f* of the unit protection cover 16. Therefore, when an impact load is input to the unit protection cover 16 from one side of the vehicle, an input weight can be smoothly transmitted to another side of the vehicle through the step wall 10*es* of the rear portion (the terminal panel 10*e*) of the front floor panel 10 and the front wall protrusion region 18*f* of the unit protection cover 16.

Accordingly, when the present configuration is employed, it is possible to further prevent deformation or damage of the battery unit 17 (the protection target unit) at the time of input of an impact load from a vehicle sideward direction.

Further, in the vehicle body rear portion of the vehicle 1 of the present embodiment, the patch member 20 that extends from the outer end portion (a joint portion with the side sill 12) in the vehicle width direction of the terminal panel 10*e* to the vicinity of the front wall protrusion region 18*f* of the unit protection cover 16 is joined to a rear surface (a surface on the opposite side of the vehicle room side) of the step wall 10*es* and the standing wall 10*er* of the rear portion (the terminal panel 10*e*) of the front floor panel 10. Therefore, when an impact load is input to the front region of the unit protection cover 16 from one side of the vehicle, an input weight can be further efficiently transmitted to another side of the vehicle through the standing wall 10*er* and the step wall 10*es* at the rear portion of the front floor panel 10 that is reinforced by the patch member 20.

Further, in the vehicle body rear portion of the vehicle 1 of the present embodiment, the pair of side flanges 15*es* (the joint flanges) that are joined to the standing wall 10*er* at the right and left rear portions of the front floor panel 10 are provided on the rear end portion of the floor tunnel 15, and each of the joint flanges 15*es* is welded to the standing wall 10*er* and the patch member 20 in a triplicated manner. Therefore, an impact load that is input from a vehicle sideward direction through the patch member 20 and the standing wall 10*er* can be efficiently transmitted to the rear end portion of the floor tunnel 15 with high stiffness. Accordingly, when the present configuration is employed, an impact load input to one side of the vehicle can be further efficiently transmitted to another side of the vehicle, and it is possible to further reliably prevent deformation or damage of the battery unit 17 (the protection target unit).

Further, in the vehicle body rear portion of the vehicle 1 of the present embodiment, the intersection ridge line 33 that extends along the vehicle width direction between the right and left side flanges 15*es* are provided on the rear end portion (the terminal panel 10*e*) of the floor tunnel 15. Therefore, the stiffness in the vehicle width direction of the rear end portion of the floor tunnel 15 is enhanced by the intersection ridge line 33. As a result, an impact load that is input from one side of the vehicle to the front region of the unit protection cover 16 is efficiently transmitted from one side flange 15*es* through the intersection ridge line 33 to the other side flange 15*es* at the rear end portion of the floor tunnel 15.

Accordingly, when the present configuration is employed, it is possible to further reliably prevent deformation or damage of the battery unit 17 (the protection target unit) at the time of input of the impact load from a vehicle sideward direction.

The present invention is not limited to the embodiment described above, and various design changes can be made without departing from the scope of the invention.

The above embodiment is described using an example in which the reinforcement structure portion that extends in the vehicle body rearward direction from the tunnel ridge line 31 at the right and left upper portions of the floor tunnel 15 is constituted of the pair of extension ridge lines 32A, 32B formed on the protrusion portions 18, 19 of the unit protection cover 16 and the rear floor panel 11. However, the reinforcement structure portion provided on the unit protection cover 16 and the rear floor panel 11 is not limited to the extension ridge lines 32A, 32B formed on the protrusion portions 18, 19. For example, a separate batch member may be attached to the unit protection cover 16 and the rear floor panel 11 so as to continue the tunnel ridge line 31 of the floor tunnel 15.

What is claimed is:

1. A vehicle body rear portion structure comprising:
   a floor tunnel that is arranged at a middle in a vehicle width direction of a front floor panel;
   a unit protection cover that covers an upper portion of a protection target unit which is arranged at a rearward position of the floor tunnel; and
   a rear floor panel that is arranged at a rearward position of the protection target unit,
   wherein a front edge portion of the rear floor panel and a rear edge portion of the front floor panel are fixed to the unit protection cover, and
   wherein the unit protection cover and the rear floor panel comprise a reinforcement structure portion that extends in a vehicle body rearward direction from a tunnel ridge line at right and left upper portions of the floor tunnel and is continuously connected from the tunnel ridge line of the floor tunnel to a ridge line of the rear floor panel.

2. The vehicle body rear portion structure according to claim 1,
   wherein a protrusion portion that rises upward and has right and left extension ridge lines each extending continuously in a vehicle body rearward direction from each of the right and left tunnel ridge lines is provided on a middle in the vehicle width direction of the unit protection cover and the rear floor panel, and
   the reinforcement structure portion is constituted of the right and left extension ridge lines of the protrusion portion.

3. The vehicle body rear portion structure according to claim 2,
   wherein the protrusion portion of the unit protection cover comprises a side wall that extends downward from each of the right and left extension ridge lines of the protrusion portion, and
   the side wall is inclined outward in the vehicle width direction and downward from the extension ridge line of the protrusion portion.

4. The vehicle body rear portion structure according to claim 1,
   wherein a rear cross member that extends along the vehicle width direction and is connected to a skeleton frame on vehicle body right and left sides is provided on the rear floor panel, and
   the reinforcement structure portion extends to a position that intersects the rear cross member.

5. A vehicle body rear portion structure, comprising:
   a floor tunnel that is arranged at a middle in a vehicle width direction of a front floor panel;
   a unit protection cover that covers an upper portion of a protection target unit which is arranged at a rearward position of the floor tunnel; and
   a rear floor panel that is arranged at a rearward position of the protection target unit,
   wherein the unit protection cover and the rear floor panel comprise a reinforcement structure portion that extends in a vehicle body rearward direction from a tunnel ridge line at right and left upper portions of the floor tunnel,
   wherein a protrusion portion that rises upward and has right and left extension ridge lines each extending continuously in a vehicle body rearward direction from each of the right and left tunnel ridge lines is provided on a middle in the vehicle width direction of the unit protection cover and the rear floor panel,
   wherein the reinforcement structure portion is constituted of the right and left extension ridge lines of the protrusion portion,
   wherein at least a middle region in the vehicle width direction of the unit protection cover is formed to rise further upward than an upper surface of the floor tunnel, and
   wherein the protrusion portion includes a front wall protrusion region that is formed on a front wall of the unit protection cover and an upper wall protrusion region that is formed on an upper wall of the unit protection cover.

6. The vehicle body rear portion structure according to claim 5,
wherein an outer end portion in the vehicle width direction at a rear of the front floor panel is connected to a skeleton frame on vehicle body right and left sides that extends along a vehicle body forward-rearward direction,
a rear edge portion of the front floor panel includes a standing wall that stands upward and a step wall that is bent and extends rearward from an upper end portion of the standing wall,
a rear end portion of the floor tunnel is joined to the standing wall of the front floor panel, and
the step wall is arranged at a position adjacent to an outside in the vehicle width direction of the front wall protrusion region of the unit protection cover.

7. The vehicle body rear portion structure according to claim 6,
wherein a patch member that extends from an outer end portion in the vehicle width direction to a vicinity of the front wall protrusion region is joined to a surface on an opposite side of a vehicle room side of the step wall and the standing wall of the front floor panel.

8. The vehicle body rear portion structure according to claim 7,
wherein a pair of joint flanges that are joined to the standing wall of the front floor panel located at right and left positions of the floor tunnel are provided on a rear end portion of the floor tunnel, and
each of the joint flanges is welded to the standing wall and the patch member in a triplicated manner.

9. The vehicle body rear portion structure according to claim 8,
wherein an intersection ridge line that extends along the vehicle width direction between the pair of joint flanges is provided on a rear end portion of the floor tunnel.

\* \* \* \* \*